(12) United States Patent
Miyagawa

(10) Patent No.: US 11,054,783 B2
(45) Date of Patent: Jul. 6, 2021

(54) IMAGE READING DEVICE AND IMAGE FORMING APPARATUS INCLUDING THE SAME

(71) Applicant: KYOCERA Document Solutions Inc., Osaka (JP)

(72) Inventor: Seiji Miyagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 385 days.

(21) Appl. No.: 16/233,656

(22) Filed: Dec. 27, 2018

(65) Prior Publication Data

US 2019/0204773 A1 Jul. 4, 2019

(30) Foreign Application Priority Data

Dec. 28, 2017 (JP) .............................. JP2017-254901
Mar. 27, 2018 (JP) .............................. JP2018-059515

(51) Int. Cl.
| | | |
|---|---|---|
| G03G 21/04 | (2006.01) | |
| B41J 29/38 | (2006.01) | |
| G03G 15/00 | (2006.01) | |
| G03G 15/20 | (2006.01) | |
| H04N 1/00 | (2006.01) | |

(52) U.S. Cl.
CPC ..... G03G 15/6508 (2013.01); G03G 15/2003 (2013.01); G03G 15/5025 (2013.01); G03G 15/602 (2013.01); G03G 15/6585 (2013.01); H04N 1/00803 (2013.01); *G03G 15/60* (2013.01); *G03G 21/046* (2013.01); *G03G 2215/00177* (2013.01); *G03G 2215/00341* (2013.01)

(58) Field of Classification Search
None
See application file for complete search history.

(56) References Cited

U.S. PATENT DOCUMENTS

2017/0187901 A1* 6/2017 Takeda ................. H04N 1/0057

FOREIGN PATENT DOCUMENTS

| | | | | |
|---|---|---|---|---|
| JP | 59212069 | A * | 11/1984 | ............... H04N 1/32 |
| JP | 6-35272 | | 2/1994 | |
| JP | 2008-182671 | | 8/2008 | |
| JP | 2010087953 | A * | 4/2010 | |
| JP | 2010-114807 | | 5/2010 | |
| JP | 2011-205273 | | 10/2011 | |
| JP | 2013138391 | A * | 7/2013 | |

* cited by examiner

*Primary Examiner* — Jill E Culler
*Assistant Examiner* — Ruben C Parco, Jr.
(74) *Attorney, Agent, or Firm* — Wenderoth, Lind & Ponack, L.L.P.

(57) ABSTRACT

An image reading device includes a marking part that applies a predetermined mark to a margin of a rear end of a document having passed through an image reading position, a mark erasing part that erases the predetermined mark when the document is discharged from a sheet discharge port, and an image data processing unit that determines whether the predetermined mark exists in image data of a document image read by an image reading unit and erases the image data of the document image when it is determined that the predetermined mark exists.

7 Claims, 17 Drawing Sheets

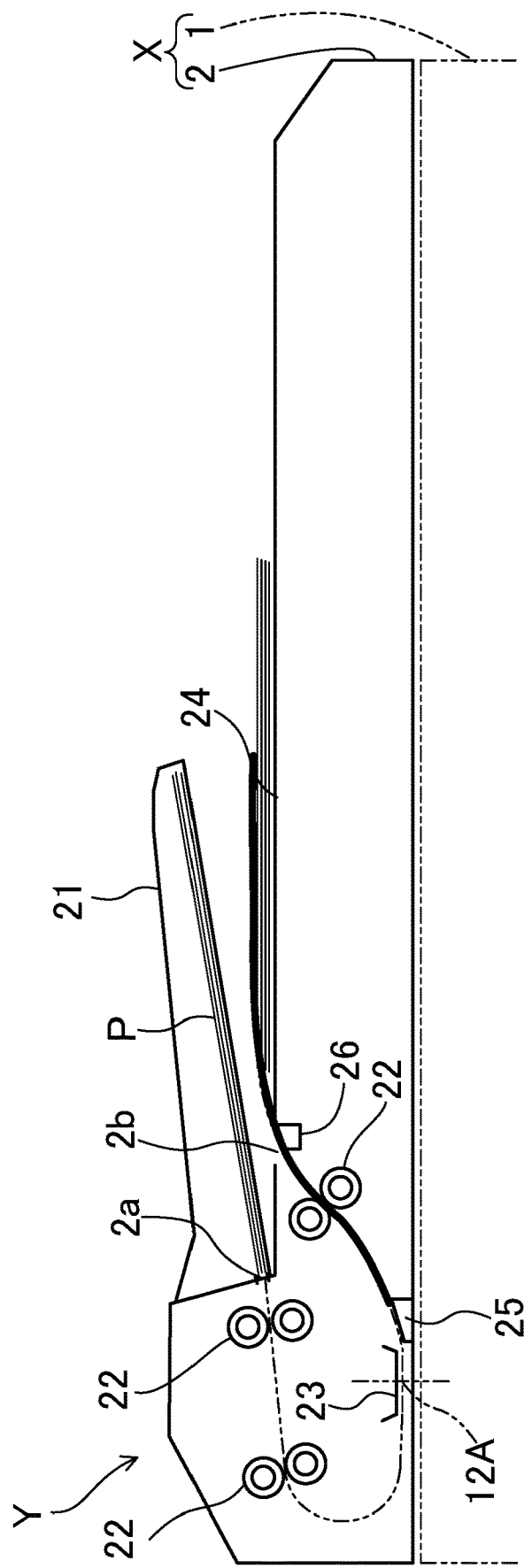

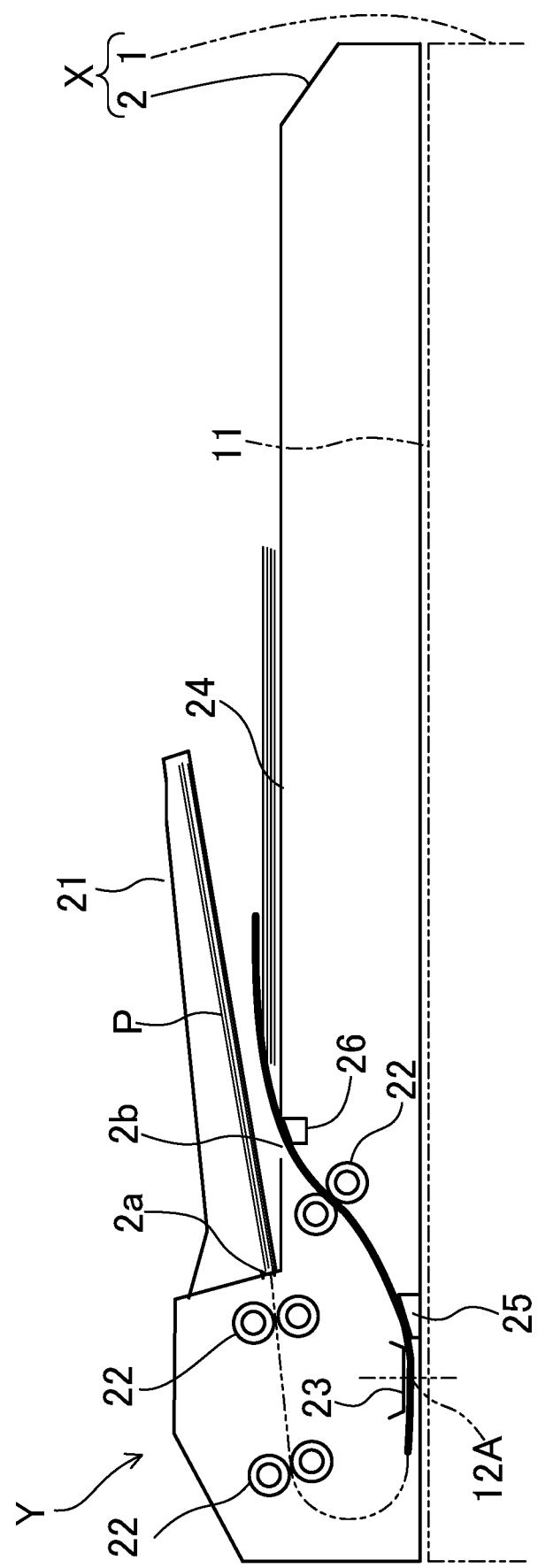

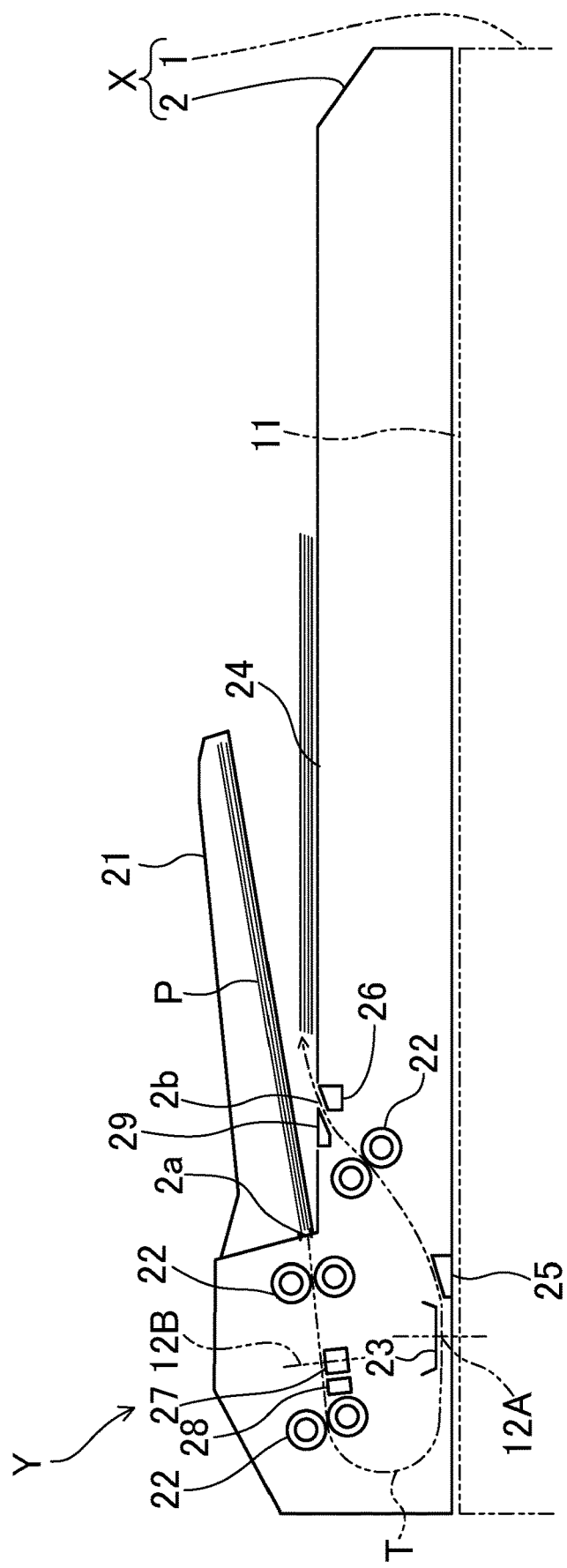

IMAGE READING DEVICE AND IMAGE FORMING APPARATUS INCLUDING THE SAME

CROSS-REFERENCE TO RELATED APPLICATION

This application is based upon and claims the benefit of priority from Japanese Patent Application No. 2017-254901 filed on Dec. 28, 2017 and Japanese Patent Application No. 2018-059515 filed on Mar. 27, 2018, the entire contents of which are incorporated herein by reference.

BACKGROUND

The technology of the present disclosure relates to an image reading device and an image forming apparatus including the same.

In the related art, there has been known an image reading device including a document feeding device that automatically feeds a document. The document feeding device has a document conveyance path from a sheet feeding port to a sheet discharge port via an upper surface side of an automatic reading glass. An image reading position is set directly above the automatic reading glass in the document conveyance path. At the time of automatic reading, an image reading unit stopped at a lower surface side of the automatic reading glass optically reads a document image passing through the image reading position. The document image read by the image reading unit is subjected to photoelectric conversion and then is stored in a data storage unit as image data.

SUMMARY

An image reading device according to one aspect of the present disclosure includes a document feeding device, a first reading unit, and an image data processing unit.

The document feeding device has a document conveyance path from a sheet feeding port to a sheet discharge port via an upper surface side of an automatic reading glass and conveys a document set on a document placing part along the document conveyance path. The first reading unit reads a document image of one surface of the document passing through a first reading position set at the upper surface side of the automatic reading glass in the document conveyance path from a lower surface side of the automatic reading glass. The image data processing unit converts the document image read by the first reading unit into image data and stores the image data.

The image reading device further includes a first marking part and a first mark erasing part. The first marking part is provided at a downstream side in a document conveyance direction from the first reading position in the document conveyance path. The first marking part applies a first predetermined mark to a margin of an upstream side in the document conveyance direction from an image formation region on the one surface of the document. The first mark erasing part is provided in the vicinity of the sheet discharge port of the document feeding device. The first mark erasing part erases the first predetermined mark applied to the margin of the document when the first predetermined mark passes through the sheet discharge port. The image data processing unit determines whether the first predetermined mark exists in the image data of the document image of the one surface read by the first reading unit. When it is determined that the first predetermined mark exists, the image data processing unit erases the image data.

BRIEF DESCRIPTION OF THE DRAWINGS

FIG. 7 is a diagram illustrating a state in which image reading of a document has been completed when document conveyance has stopped while the document is passing through a sheet discharge port.

FIG. 8 is a view illustrating a state in which image reading of a document has not been completed when document conveyance has stopped while the document is passing through a sheet discharge port.

FIG. 9 is a view corresponding to FIG. 3, which illustrates an embodiment 2.

DETAILED DESCRIPTION

Hereinafter, embodiments of the present disclosure will be described in detail on the basis of the drawings. It is noted that the technology of the present disclosure is not limited to the following embodiments.

Embodiment

Figure 1:
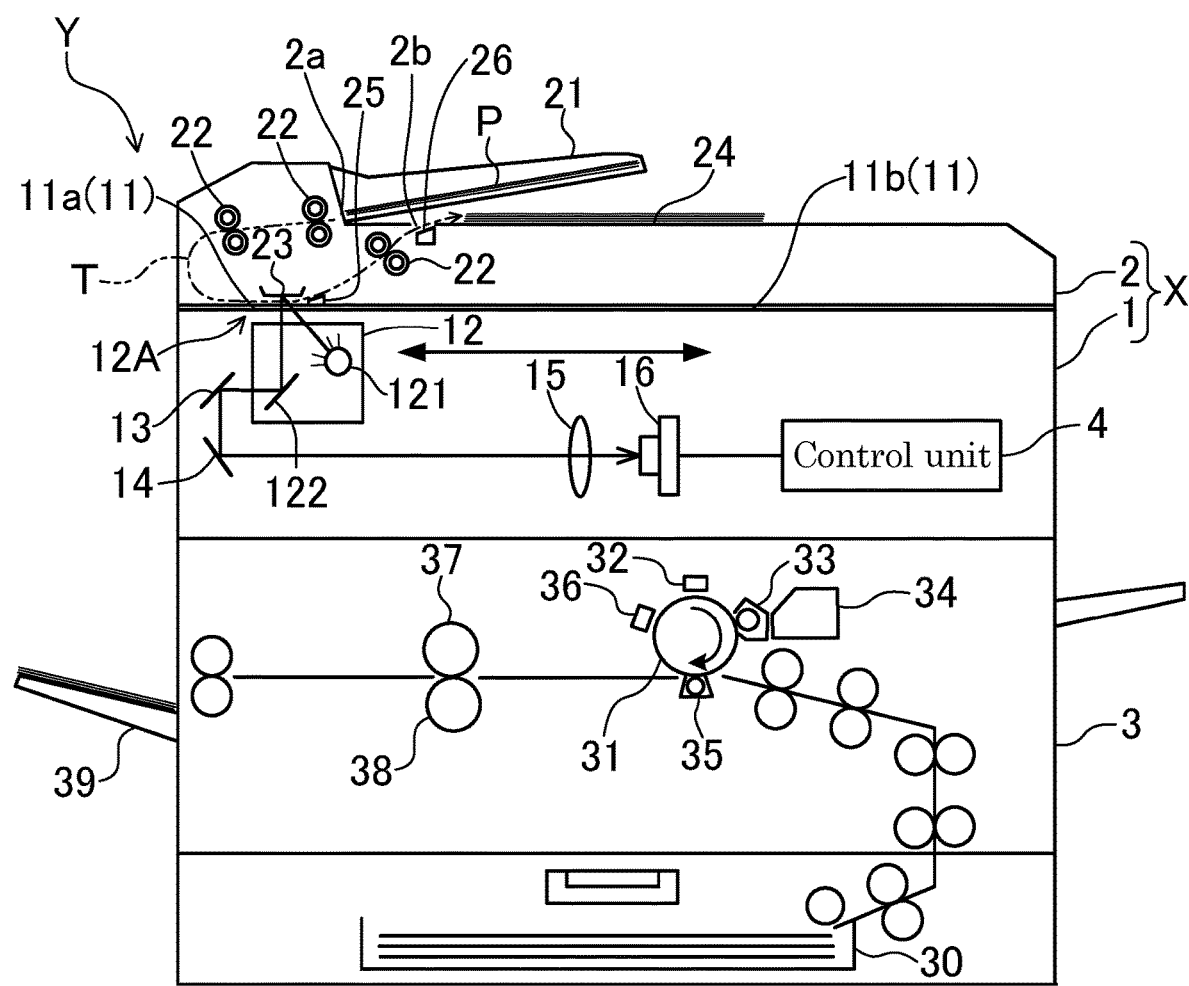
FIG. 1 is a schematic configuration diagram illustrating an image forming apparatus including an image reading device in the present embodiment.
Figure 2:
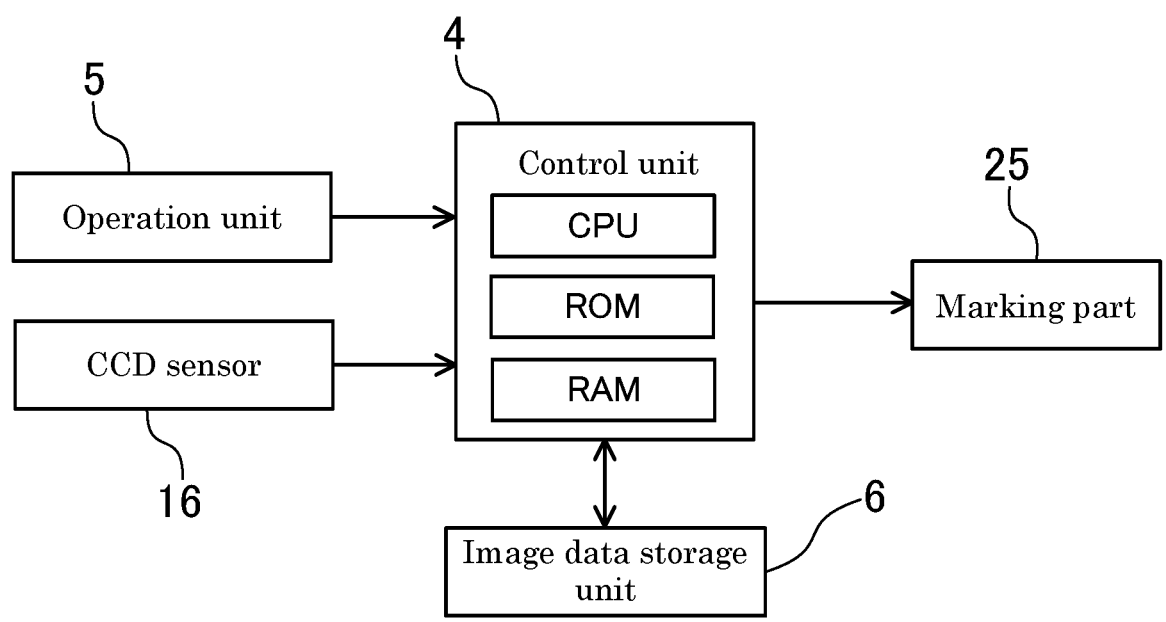
FIG. 2 is a block diagram illustrating a configuration of a control system of an image reading device.

FIG. 1 illustrates a multifunctional peripheral Y including an image reading device X in an embodiment. The multifunctional peripheral Y includes an image reading unit 1, a document feeding device 2, an image forming unit 3, a control unit 4, an operation unit 5 (illustrated only in FIG. 2)

and the like. The image reading unit 1 and the document feeding device 2 constitute the image reading device X.

The multifunctional peripheral Y also serves as an electrophotographic image forming apparatus that forms an image on a sheet on the basis of image data read by the image reading unit 1 or image data inputted from an information processing apparatus such as an external personal computer.

The image forming unit 3 includes a sheet feeding cassette 30, a photosensitive drum 31, a charging device 32, a developing device 33, a toner container 34, a transfer roller 35, a static eliminating device 36, a fixing roller 37, a pressure roller 38, a sheet discharge tray 39 and the like.

In the image forming unit 3, an image is formed on a sheet supplied from the sheet feeding cassette 30 according to the following procedure. Specifically, firstly, the photosensitive drum 31 is uniformly charged to a predetermined potential by the charging device 32. Next, light based on image data is irradiated to a surface of the photosensitive drum 31 from a laser scanning unit (LSU; not illustrated). In this way, an electrostatic latent image is formed on the surface of the photosensitive drum 31. Then, the electrostatic latent image on the photosensitive drum 31 is developed by the developing device 33 as a toner image. It is noted that toner is replenished to the developing device 33 from the toner container 34.

The toner image formed on the photosensitive drum 31 is transferred to a sheet by the transfer roller 35. Thereafter, the toner image transferred to the sheet is heated in the fixing roller 37 so as to be molten and fixed when the sheet passes through between the fixing roller 37 and the pressure roller 38. It is noted that the potential of the photosensitive drum 31 is eliminated by the static eliminating device 36.

The image reading unit 1 includes a contact glass 11, a reading unit 12, mirrors 13 and 14, an optical lens 15, and a CCD sensor 16.

The contact glass 11 is provided on an upper surface of a rectangular box-like case body constituting an outer wall of the image reading unit 1. The contact glass 11 is configured with a fixed reading glass 11a that occupies the majority of the upper surface and a rectangular plate-like automatic reading glass 11b positioned at the left side of the fixed reading glass 11a to extend in a front and rear direction.

The reading unit 12 is provided in the case body and has a LED light source 121 and a mirror 122. The reading unit 12 is configured to be movable in a right and left direction (a sub-scanning direction) of FIG. 1 by a driving mechanism (not illustrated) using a driving motor such as a stepping motor. When the reading unit 12 is moved in the sub-scanning direction by the driving motor, light irradiated from the LED light source 121 to the contact glass 11 is scanned in the sub-scanning direction.

The mirror 122 reflects, toward a mirror 13, reflected light when light has been irradiated from the LED light source 121 to a document P passing through a reading position 12A. Then, the light reflected by the mirror 122 is led to the optical lens 15 by the mirrors 13 and 14. It is noted that the mirrors 13 and 14 are installed in a carriage (not illustrated) and move in the sub-scanning direction at a half speed of the reading unit 12 at the time of a reading operation by a sheet fixing scheme to be described later.

The optical lens 15 collects incident light and causes the light to be incident on the CCD sensor 16. The CCD sensor photoelectrically converts the reflected light from the document image into analog image data and outputs the analog image data to a control unit (an image data processing unit) 4. The control unit 4 converts the document image into digital data (image data) on the basis of the analog image data received from the CCD sensor 16, and allows an image data storage unit 6 (see FIG. 2) to store the digital data.

The document feeding device 2 is an automatic document feeding device including a document feeding tray (a document placing part) 21, a plurality of conveying rollers 22, a document cover 23, and a sheet discharge tray 24. Furthermore, the document feeding device 2 is openable/closeable with respect to the contact glass 11.

In the document feeding device 2, each of the conveying rollers 22 is driven by a motor (not illustrated), so that the document P set on the document feeding tray 21 is conveyed along a predetermined document conveyance path T. The document conveyance path T is an approximately U shape conveyance path from a sheet feeding port 2a of the document feeding device 2 to a sheet discharge port 2b via the automatic reading glass 11b. The document feeding tray 21 is provided at a conveyance upstream side of the sheet feeding port 2a and the sheet discharge tray 24 is provided at a conveyance downstream side of the sheet discharge port 2b. The document P discharged from the sheet discharge port 2b is sequentially stacked on the sheet discharge tray 24. The reading position 12A is set above the automatic reading glass 11b in the document conveyance path T.

A reading scheme of the document image by the image reading device X includes two schemes of a sheet-through scheme and a fixing scheme. In the sheet-through scheme, the reading unit 12 is made stationary below the automatic reading glass 11b (the reading position 12A), and in that state, the document P is moved and conveyed by the document feeding device 2 from one side to the other side in the sub-scanning direction with respect to the reading position 12A, so that the image of each document P is read. On the other hand, in an image reading operation according to the sheet fixing scheme, the reading unit 12 is moved from one side to the other side in the sub-scanning direction in a state in which the document P has been fixed on the fixed reading glass 11a, so that the image of the document P is read. In the sheet fixing scheme, the document feeding device 2 simply serves as a document pressing unit.

Figure 3:
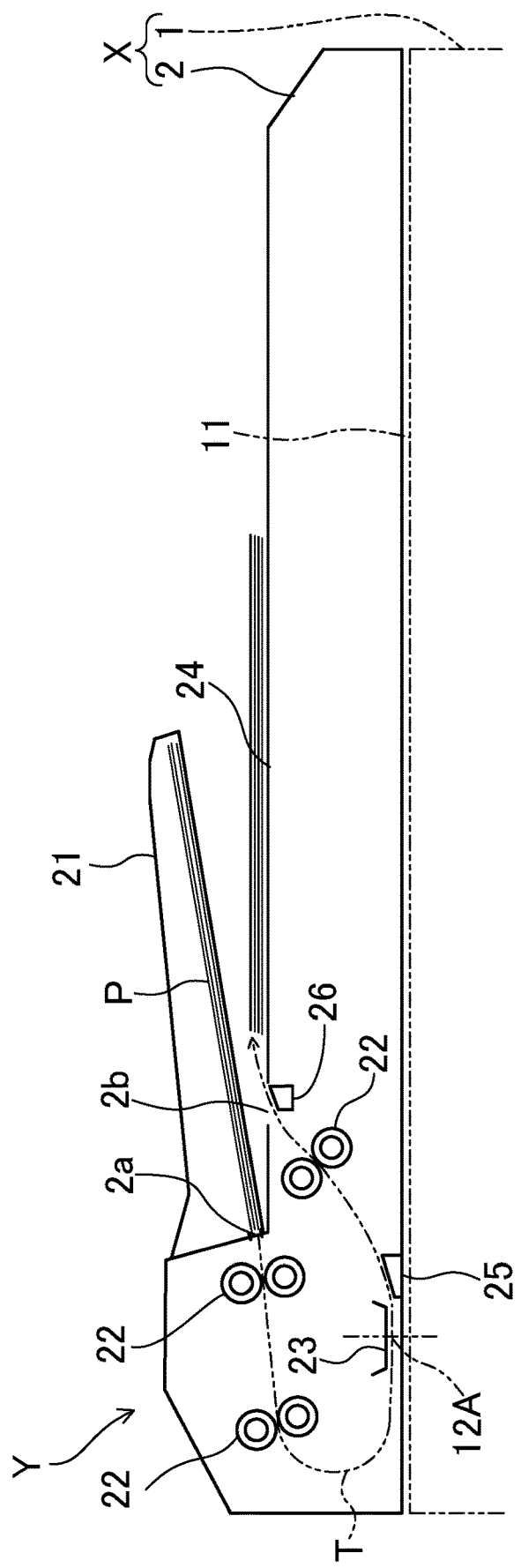
FIG. 3 is an enlarged side view illustrating a document feeding device mounted at an image reading device.

As illustrated in FIG. 3, at the conveyance downstream side from the reading position 12A in the document conveyance path T, a marking part 25 is provided to apply a predetermined mark M to the document P after passing through the reading position 12A. Furthermore, in the vicinity of the sheet discharge port 2b of the document feeding device 2, a heater part 26 is provided as a mark erasing part for erasing the predetermined mark applied to the document P.

Figure 4:
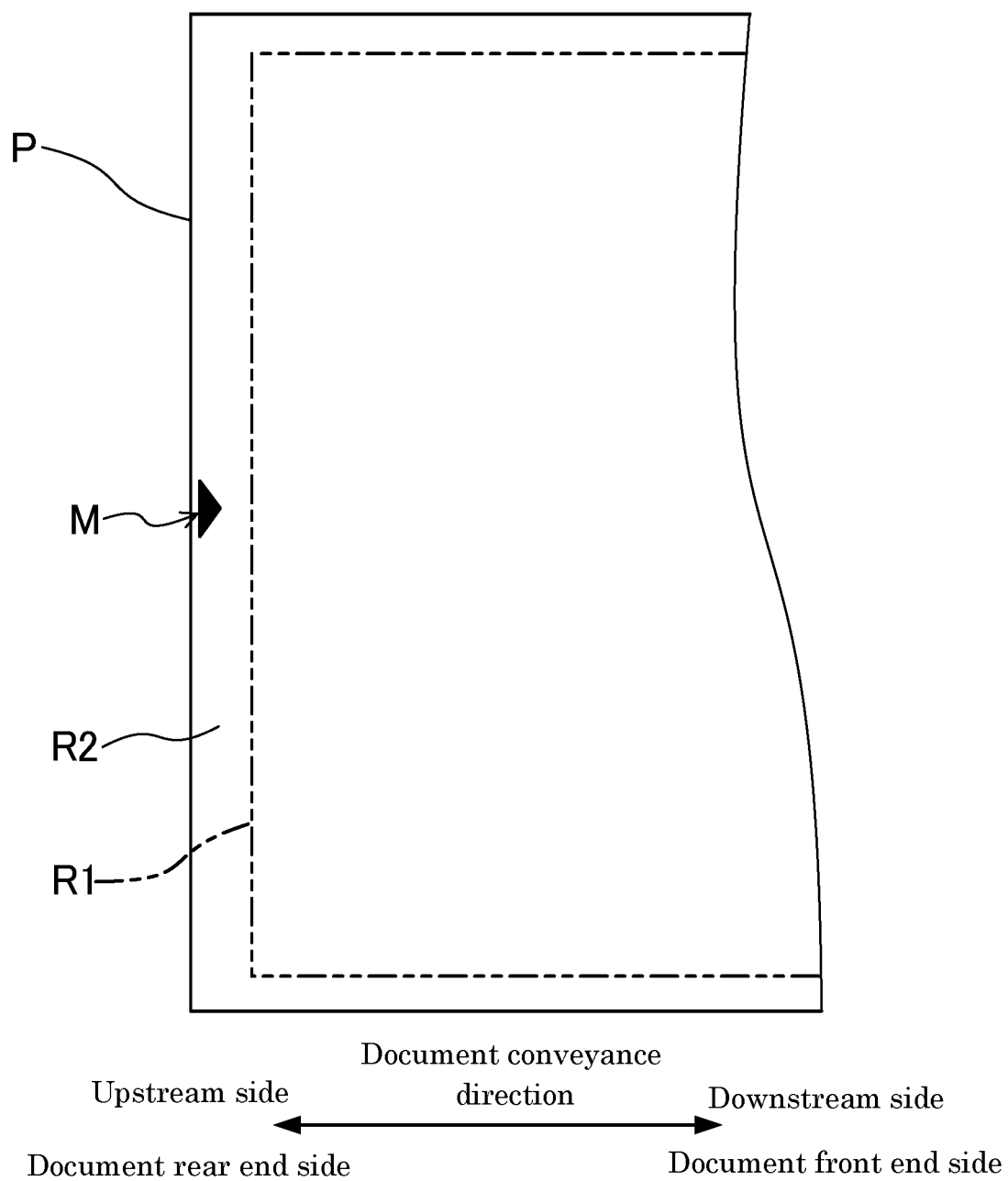
FIG. 4 is a diagram illustrating a state in which a predetermined mark (a first predetermined mark) has been applied to a margin of a rear end side of an image formation region on a front surface of a document.

The marking part 25 applies the predetermined mark M to a rear end of the document P by using ink (for example, commercial friction ink and the like) that becomes transparent and invisible when heat is applied thereto. FIG. 4 illustrates an example of the predetermined mark M applied to the document P by the marking part 25. As illustrated in FIG. 4, the predetermined mark M is formed in a margin R2 of a document rear end side other than an image formation region R1 (a region where an image can be formed) of the document P. In this example, the predetermined mark M is formed at a center part of the margin R2 in a document width direction; however, the present disclosure is not limited thereto and for example, the predetermined mark M may be formed at one end in the document width direction. Furthermore, the predetermined mark M has a triangular shape of solid coating as an example; however, the present disclosure is not limited thereto and the predetermined mark M may be any marks as long as they are marks having a size and a density readable by the reading unit 12.

Figure 5:
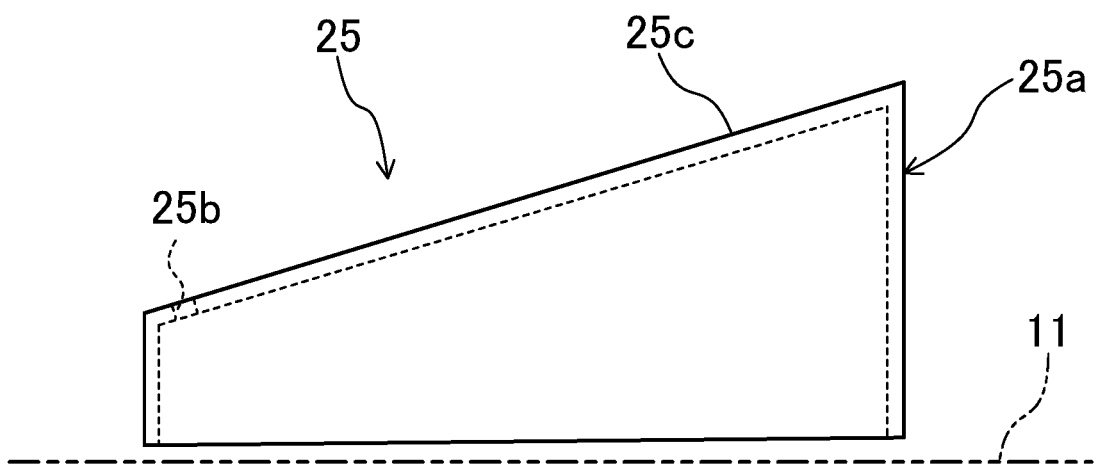
FIG. 5 is an enlarged side view illustrating a marking part.

FIG. 5 is an enlarged side view illustrating the marking part 25. The marking part 25 has a trapezoidal column-shaped body case 25a extending in the document width direction (a direction vertical to the paper surface of FIG. 5) and an ink hole 25b for injecting ink. An upper surface 25c of the body case 25a is an inclined surface which becomes higher as it goes from an upstream side to a downstream side in the document conveyance direction and also serves as a guide surface that guides the document P. The ink hole 25b is formed at an end of the upper surface 25c of the body case 25a at the conveyance upstream side. The closer the position of the ink hole 25b to the reading position 12A, the greater the effect. When the marking part 25 (the ink hole 25b) approaches the reading position 12A too closely, since a read image may be shadowed, it is conditional that illuminance at the reading position 12A does not decrease below a predetermined value. The body case 25a is provided therein with a mechanism (for example, a piezoelectric element) for discharging ink from the ink hole 25b, and the like.

The heater part 26 is provided in the vicinity just below the ink hole 25b in the present embodiment. The heater part 26 has a trapezoidal columnar shape when viewed from the document width direction. The heater part 26, for example, is provided therein with an electric heater. An upper surface of the heater part 26 is an inclined surface which becomes higher as it goes from the upstream side to the downstream side in the document conveyance direction. The upper surface of the heater part 26 also serves as a guide surface that guides the document P. The heater part 26 is configured to be able to generate a heat quantity enough to allow the predetermined mark M applied to the document P passing through its own upper surface to be transparent.

The dimension of the heater part 26 in the document width direction is set to be identical to or slightly larger than the width of the predetermined mark M. The heater part 26 is slidable between a first position and a second position in the document width direction. The first position is a position at which a center part (a part provided with the predetermined mark M) in the sheet width direction of the document P passes through the heater part 26 and a position at which the predetermined mark M can be transparent by the heat of the heater part 26. The second position, for example, is a position at which the heater part 26 is located outward from positions of both ends in the width direction of the document P and a position at which the predetermined mark M is not be able to be transparent by the heat of the heater part 26. The heater part 26 is used at the first position during document conveyance (during image reading) by the document feeding device 2.

The operations of the marking part 25 and the heater part 26 are controlled by the control unit 4. The control unit 4 includes a microcomputer having a CPU, a ROM, and a RAM. The control unit 4 operates the marking part 25 when automatic reading control (reading control by the sheet-through scheme to be described later) of the document P is performed, thereby applying the predetermined mark M to the document P. When an automatic reading operation is restarted after a jam of the document p occurs, the control unit 4 determines the presence or absence of the predetermined mark M and erases or stores image data.

Figure 6A:
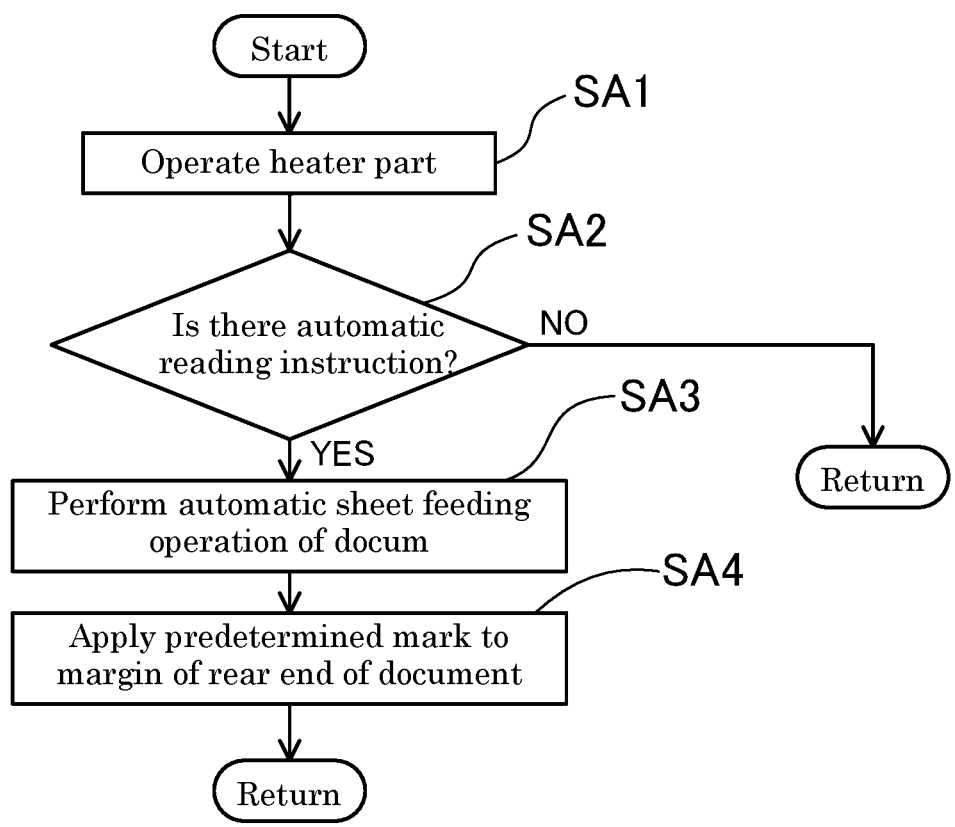
FIG. 6A is a flowchart illustrating details of marking control performed by a control unit.

With reference to FIG. 6A, details of marking control performed by the control unit 4 at the time of automatic document feeding will be described.

In step SA1, after the image reading device X is powered on, the control unit 4 operates the heater part 26.

In step SA2, on the basis of an operation signal from the operation unit 5, the control unit 4 determines whether there is an automatic reading instruction (that is, a reading instruction by the sheet-through scheme) of the document P from a user. When this determination is NO, the control unit 4 returns, and when this determination is YES, the control unit 4 proceeds to step SA3.

In step SA3, the control unit 4 operates the document feeding device 2 to convey the document P set on the document feeding tray 21 along the document conveyance path T one by one.

In step SA4, the control unit 4 calculates the position of the document P on the basis of a signal from a document detection sensor (not illustrated) provided on the document conveyance path T and a conveyance speed. Then, when it is determined that the margin R2 (see FIG. 4) of the rear end of the document P has reached the ink hole 25b of the marking part 25, the control unit 4 operates the marking part 25 to discharge ink from the ink hole 25b. By so doing, the predetermined mark M is applied to the margin (see FIG. 4).

Figure 6B:
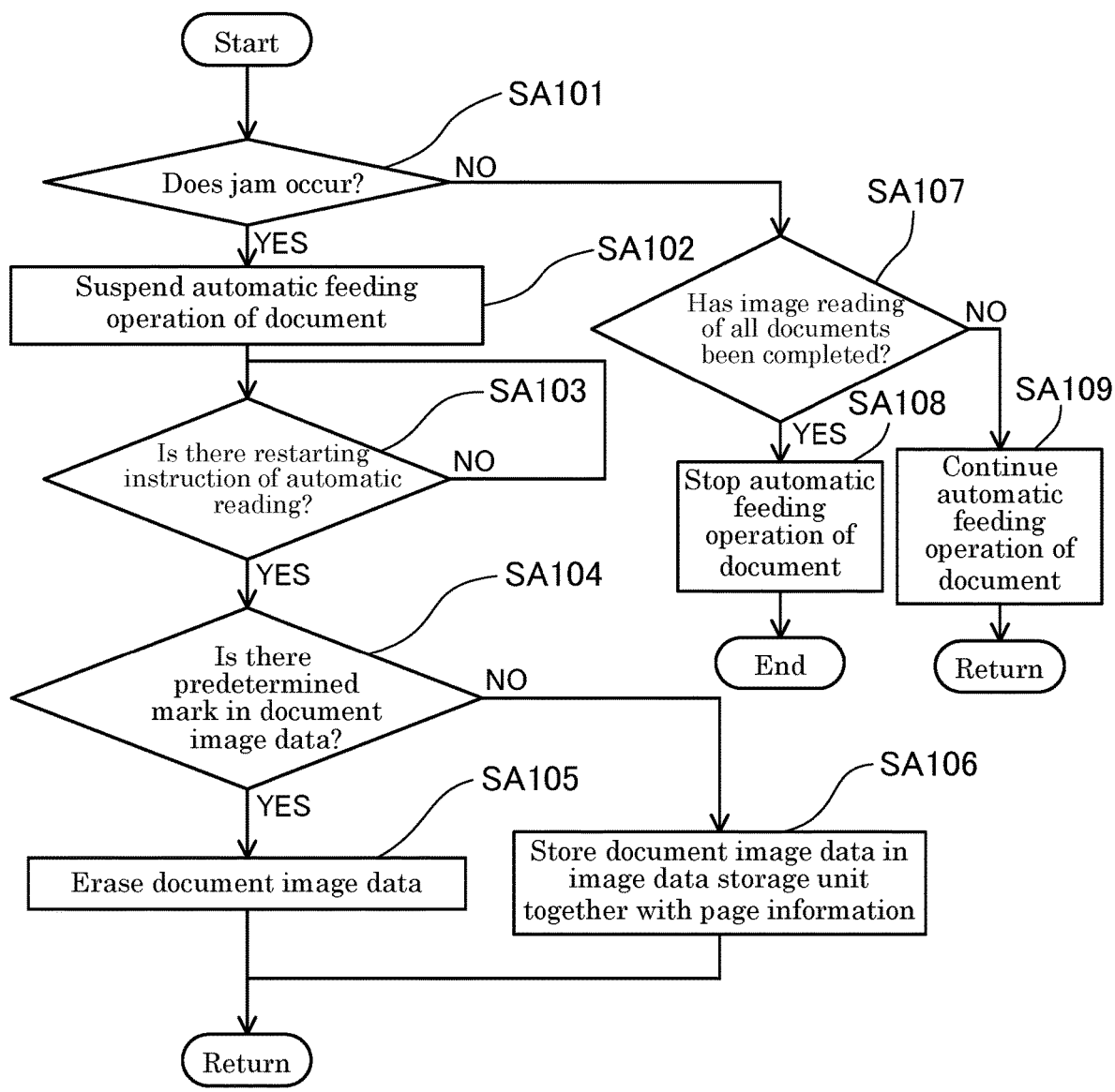
FIG. 6B is a flowchart illustrating details of document feeding control including a jam detection process performed by a control unit.

Next, with reference to FIG. 6B, details of automatic document feeding control including a jam detection process in the control unit 4 will be described.

In step SA101, on the basis of a signal from a jam sensor (not illustrated) provided in the document feeding device 2, the control unit 4 determines whether a jam (a document jam) has occurred. When this determination is NO, the control unit 4 proceeds to step SA107, and when this determination is YES, the control unit 4 proceeds to step SA102.

In step SA102, the control unit 4 suspends the automatic feeding operation (that is, the automatic reading operation) of the document performed by the document feeding device 2.

In step SA103, on the basis of an operation signal from the operation unit 5, the control unit 4 determines whether there is a restarting instruction of the automatic reading of the document P. When this determination is NO, the control unit 4 performs the process of step SA103 again, and when this determination is YES, the control unit 4 proceeds to step SA104.

In step SA104, the control unit 4 determines whether the predetermined mark M exists in document image data of an initially read document P after the automatic reading is restarted. When this determination is NO, the control unit 4 proceeds to step SA106, and when this determination is YES, the control unit 4 proceeds to step SA105.

In step SA105, the control unit 4 erases the document image data having the predetermined mark M from a memory without storing the document image data in the image data storage unit 6, and then returns.

In step SA106, the control unit 4 stores the document image data in the image data storage unit 6 together with page information thereof, and then returns.

In step SA107 which is performed when the determination of step SA101 is NO, the control unit 4 determines whether the image reading has been completed for all documents P initially set on the document feeding tray 21. When this determination is NO, the control unit 4 proceeds to step SA109 to continue the automatic feeding operation of the document P and to perform reading of a document image by the CCD sensor 16 of the image reading unit 1, and then returns. On the other hand, when this determination is YES, the control unit 4 proceeds to step SA108 to stop the automatic feeding operation of the document P, and proceeds to end.

In the image reading unit 1 configured as above, when a sheet jam (a jam) has occurred during the automatic reading (during the sheet feeding operation by the document feeding device 2) of the document P, a user opens the outer cover of the document feeding device 2 and removes the cause of the sheet jam, and then needs to set the document P on the document feeding tray 21 again. In such a case, when a document P already discharged from the sheet discharge port 2b is set, time required for reading the document P again becomes longer. Consequently, many users determines that image reading of a document P completely discharged from the document feeding device 2 has been completed, and sets only other documents P on the document feeding tray 21 again.

However, as indicated by thick lines of FIG. 7 and FIG. 8, it is not possible to determine whether image reading has been completed for a document P stopped while passing through the sheet discharge port 2b (that is, whether the rear end of the document P has passed through the reading position 12A). When such a document P is excluded from documents to be set again, image data of the document P may be lost, and when such a document P is put into the documents to be set again, image data of the document P may be redundantly stored.

In contrast, in the present embodiment, the marking part 25 is configured to be provided at the downstream side in the document conveyance direction from the reading position 12A in the document conveyance path T, and to apply the predetermined mark M to the margin R2 (see FIG. 4) of the rear end of the document P having passed through the reading position 12A. Furthermore, the control unit 4 is configured to determine whether the predetermined mark M exists in document image data after a jam occurs and a reading operation of the document P is restarted, and to erase the document image data when it is determined that the predetermined mark M exists (in the case of YES in step SA104). Consequently, as indicated by the thick line of FIG. 7, the image data of the document P stopped in the state in which document image reading has been completed can be prevented from being redundantly stored in the image data storage unit 6. On the other hand, when it is determined that the predetermined mark M does not exist the document image data (in the case of NO in step SA104), the image data of the document P is stored in the image data storage unit 6. Consequently, as indicated by the thick line of FIG. 8, the image data of the document P stopped in the state in which the document image reading has not been completed is not lost without being stored.

It is noted that when the document P is discharged from the sheet discharge port 2b, since the predetermined mark M applied to the document P becomes transparent by the heat of the heater part 26, the document P discharged to the sheet discharge tray 24 is not stained due to unnecessary remaining of the predetermined mark.

Furthermore, in the present embodiment, the heater part is configured to be slidably movable between the first position, at which the predetermined mark M applied to the document P discharged from the sheet discharge port 2b is erasable, and the second position at which the predetermined mark M is not erasable.

According to such a configuration, when the document P (see the thick lines of FIG. 7 and FIG. 8) stopped while passing through the sheet discharge port 2b due to the occurrence of a jam is taken out, the heater part 26 is moved to the second position from the first position, so that it is possible to prevent the predetermined mark M from being unintentionally erased by the heat of the heater part 26.

Furthermore, in the present embodiment, the marking part 25 applies the predetermined mark M by using ink (ink erasable by heat) that becomes transparent by heat, and the applied predetermined mark M is erased by the heat of the heater part 26.

According to such a configuration, it is possible to easily erase the predetermined mark M applied to the document P without leaving traces of the predetermined mark M.

Embodiment 2

FIG. 9 is a view corresponding to FIG. 3, which illustrates an embodiment 2. An image reading device X of the present embodiment is different from the embodiment 1 in that images of both surfaces (a front surface and a rear surface) of the document P fed by the document feeding device 2 are readable. In the following description, an upper surface of the document P set on the document feeding tray 21 is defined as a front surface (one surface) and a lower surface of the document P is defined as a back surface (the other surface). Furthermore, in the following embodiment, the same elements as those of the embodiment 1 are denoted by the same reference numerals and detailed description thereof will be omitted.

In the image reading device X of the present embodiment, at a lateral side of the document conveyance path T in the document feeding device 2, a contact image sensor 27 is provided to read a document image of the back surface of the document P. The contact image sensor 27 is disposed to face a reading position 12B set between two conveying rollers 22 closer to an upstream side than a curved part of the U-shaped document conveyance path T. The contact image sensor 27 is provided adjacent to the inside of the U-shaped document conveyance path T. In the present embodiment, the CCD sensor 16 corresponds to a first reading unit and the contact image sensor 27 corresponds to a second reading unit. Furthermore, the reading position 12A corresponds to a first reading position and the reading position 12B corresponds to a second reading position.

Figure 10:
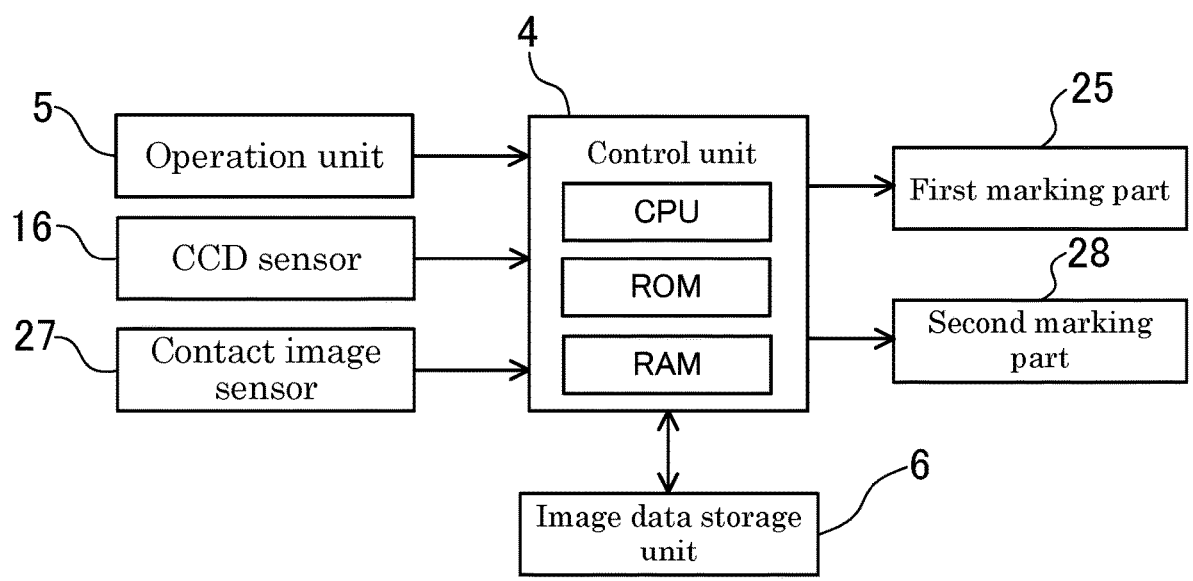
FIG. 10 is a view corresponding to FIG. 2, which illustrates an embodiment 2.

The contact image sensor 27 includes a box-like sensor casing extending in the document width direction (a main scanning direction). The sensor casing is provided therein with an optical element (not illustrated) such as a line sensor and a light source. As illustrated in FIG. 10, the contact image sensor 27 is connected to the control unit 4 via a signal line.

The control unit 4 receives an image signal of a back side image of the document P from the contact image sensor 27, and receives an image signal of a front side image of the document P from the CCD sensor 16. On the basis of these signals, the control unit 4 stores the document images of the document P together with page information and front/back information thereof. The page information is information indicating a sheet number of the document P having the document image, and the front/back information is information indicating whether the document image is the front side image or the back side image of the document P. The control unit 4 displays the stored document images on a display screen (not illustrated) in page order and in order from front to back as necessary.

At the conveyance downstream side of the contact image sensor 27, a marking part 28 is provided. In the following description, the marking part 25 provided at the downstream side of the reading position 12A is called a first marking part and the marking part 28 provided at the downstream side of the contact image sensor 27 is called a second marking part.

The first marking part 25 applies the predetermined mark M (hereinafter, referred to as a first predetermined mark) to the margin R2 of the rear end of the front surface of the document P. The marking part 28 applies a predetermined mark m (hereinafter, referred to as a second predetermined mark) to a margin r2 of the document rear end side from an image formation region r1 of the document P. In the present embodiment, the second predetermined mark m applied by the second marking part 28 is different from the first predetermined mark M applied by the first marking part 25, and for example, has a circular shape of solid coating. It is noted that the first predetermined mark M and the second predetermined mark m may be the same mark.

The second marking part 28 operates by discharging ink from an ink hole similarly to the first marking part 25. An ink discharge side-surface of the second marking part 28 is a flat surface along the document conveyance path T and serves as a guide surface that guides the document P. The closer the ink hole of the second marking part 28 to the contact image sensor 27, the greater the effect.

In the vicinity of the sheet discharge port 2b of the document feeding device 2, a first heater part 26 (a first mark erasing part) and a second heater part 29 (a second mark erasing part) are provided. The first heater part 26 erases the first predetermined mark M applied to the front surface of the document P by heat. Since the configuration of the first heater part 26 has been described in the embodiment 1, detailed description thereof will be omitted. The second heater part 29 is disposed to face the first heater part 26 while interposing the document conveyance path T between the second heater part 29 and the first heater part 26. The second heater part 29 erases the second predetermined mark m applied to the back surface of the document P by heat. The second heater part 29 is provided therein with an electric heater similarly to the first heater part 26.

The first heater part 26 and the second heater part 29 are connected to each other via a connection member (not illustrated). Furthermore, the first heater part 26 and the second heater part 29 are slidable between a first position and a second position in the document width direction. The first position is a position at which a center part (a part provided with the first and second predetermined mark M and m) in the sheet width direction of the document P passes through the first and second heater parts 26 and 29. That is, the first position is a position at which the first and second predetermined mark M and m can be transparent by the heat of the first and second heater parts 26 and 29. The second position, for example, is a position at which the first and second heater parts 26 and 29 are located outward from positions of both ends in the width direction of the document P. That is, the second position is a position at which the first and second predetermined mark M and m are not be able to be transparent by the heat of the first and second heater parts 26 and 29. Each of the first and second heater parts 26 and 29 is used at the first position during document conveyance (during image reading) by the document feeding device 2.

Figure 12A:
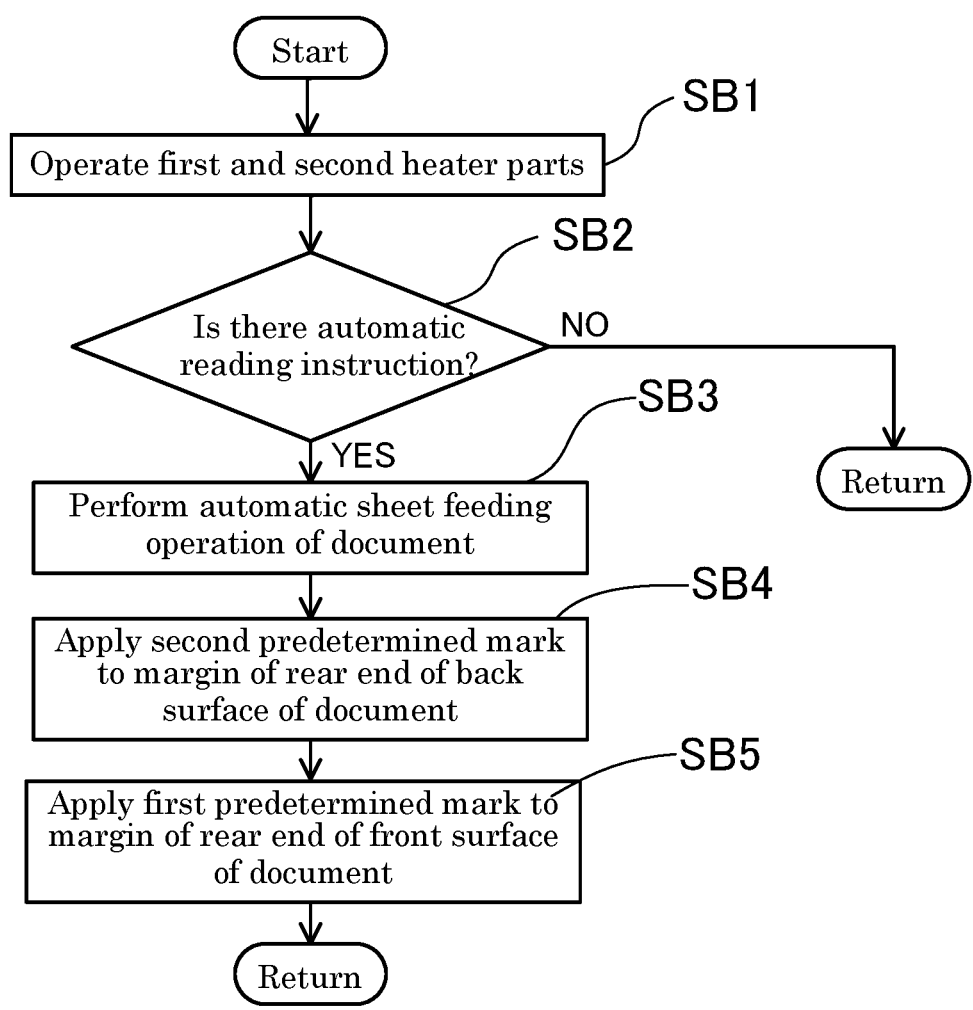
FIG. 12A is a view corresponding to FIG. 6A, which illustrates an embodiment 2.

Next, with reference to FIG. 12A, details of marking control performed by the control unit 4 of the present embodiment at the time of automatic document feeding will be described.

In step SB1, after the image reading device X is powered on, the control unit 4 operates the first heater part 26 and the second heater part 29.

In steps SB2 and SB3, the control unit 4 performs processes similar to those of steps SA2 and SA3 of the embodiment 1.

Figure 11:
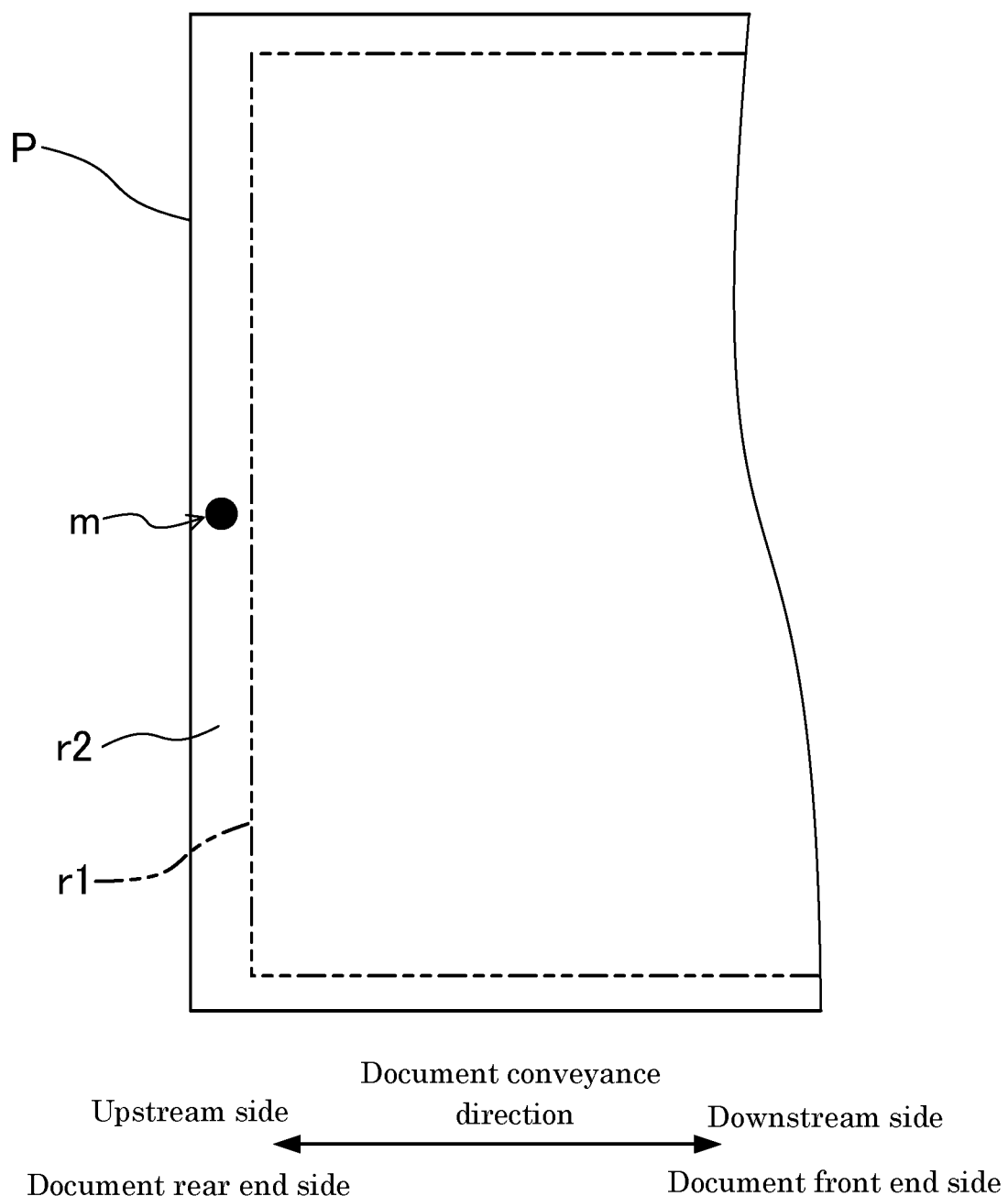
FIG. 11 is a diagram illustrating a state in which a predetermined mark (a second predetermined mark) has been applied to a margin of a rear end side of an image formation region on a back surface of a document.

In step SB4, the control unit 4 calculates the position of the document P on the basis of a signal from a document detection sensor (not illustrated) provided on the document conveyance path T and a conveyance speed. Then, when it is determined that the margin r2 (see FIG. 11) of the rear end of the back surface of the document P has reached the ink hole of the second marking part 28, the control unit 4 operates the second marking part 28 to discharge ink from the ink hole. By so doing, the second predetermined mark m is applied to the margin r2.

In step SB5, when it is determined that the margin R2 (see FIG. 4) of the rear end of the front surface of the document P has reached the ink hole 25b of the first marking part 25, the control unit 4 operates the first marking part 25 to discharge ink from the ink hole 25b. By so doing, the control unit 4 allows the first predetermined mark M to be applied to the margin R2, and then returns.

Figure 12B:
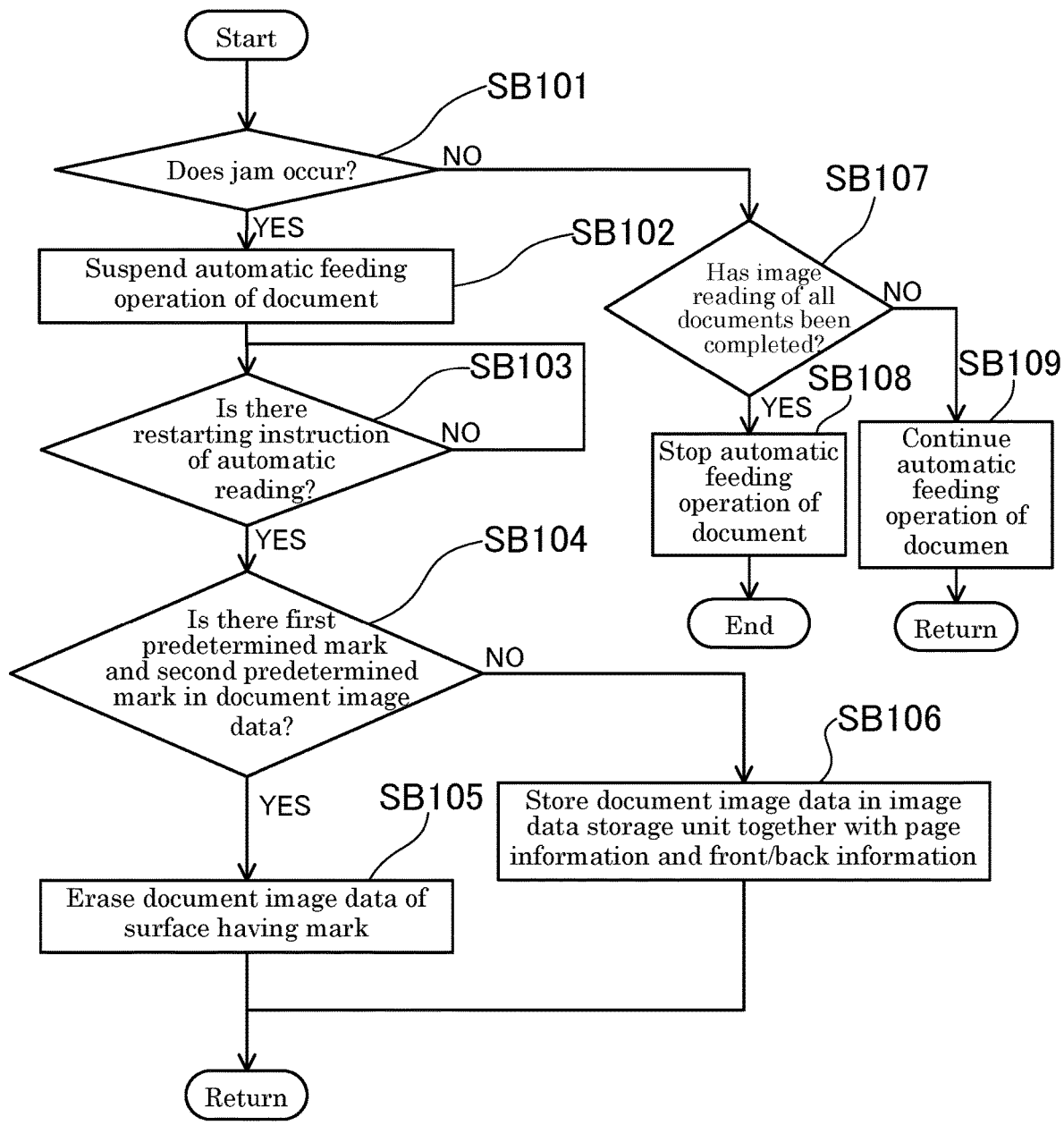
FIG. 12B is a view corresponding to FIG. 6B, which illustrates an embodiment 2.

Next, with reference to FIG. 12B, details of automatic document feeding control including a jam detection process in the control unit 4 of the present embodiment will be described.

In steps SB101 to SB103, the control unit 4 performs processes similar to those of steps SA101 to SA103 of the embodiment 1.

In step SB104, the control unit 4 determines whether the first predetermined mark M or the second predetermined mark m exists in initially read document image data after automatic reading is restarted. When this determination is NO, the control unit 4 proceeds to step SB106, and when this determination is YES, the control unit 4 proceeds to step SB105.

In step SB105, the control unit 4 erases the document image data of a surface (the front surface or the back surface) having the mark M or m.

In step SB106, the control unit 4 stores the document image data in the image data storage unit 6 together with page information and front/back information thereof, and then returns.

In steps SB107 and SB108, the control unit 4 performs processes similar to those of steps SA107 and SA108 of the embodiment 1.

In step SB109, the control unit 4 continues the automatic feeding operation of the document P and performs a document image reading operation by the contact image sensor 27 and the CCD sensor 16, and then returns.

As described above, in the present embodiment, the control unit 4 is configured to determine whether the first predetermined mark M exists in image data of a document image initially read by the image reading device X after a jam occurs, to allow the image data storage unit 6 to store the image data when it is determined that the first predetermined mark M does not exist, and to erase the image data when it is determined that the first predetermined mark M exists. Furthermore, the control unit 4 is configured to determine whether the second predetermined mark m exists in the image data of the document image initially read by the image reading device X after the jam occurs, to allow the image data storage unit 6 to store the image data when it is determined that the second predetermined mark m does not exist, and to erase the image data when it is determined that the second predetermined mark m exists.

Figure 13:
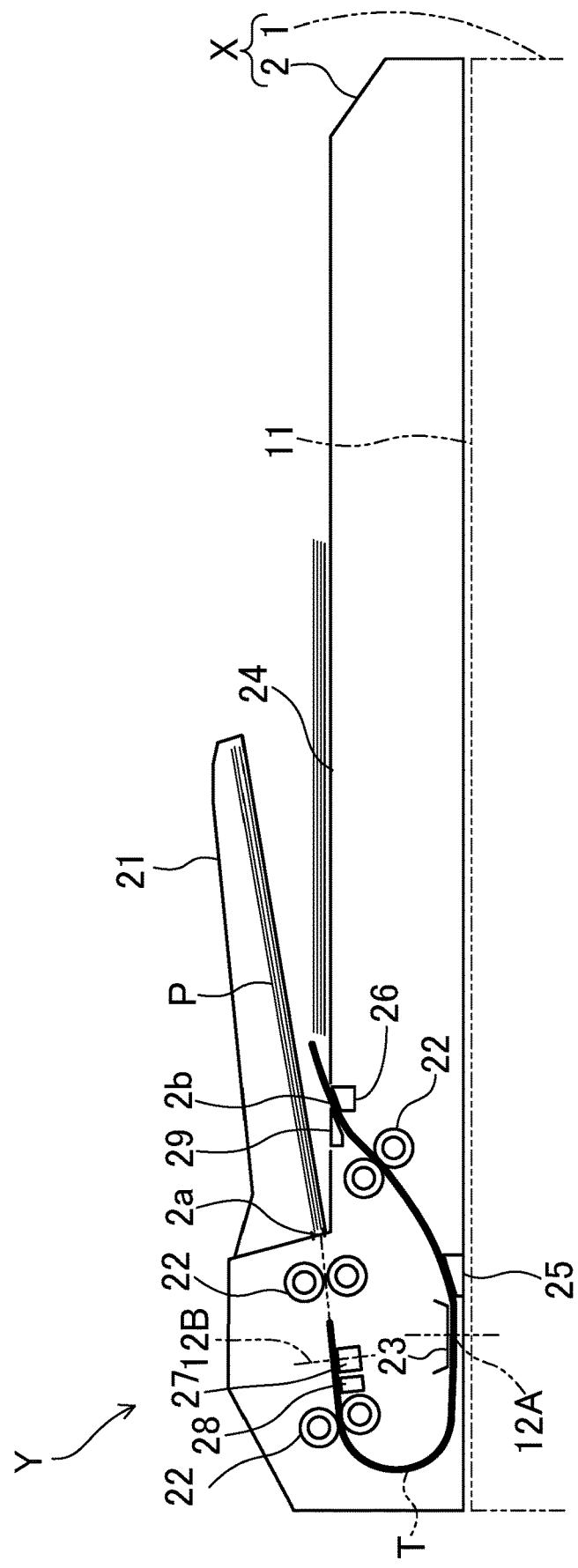
FIG. 13 is a diagram illustrating a state in which reading of a document image on a back surface and a front surface of a document has not been completed in an embodiment 2.
Figure 14:
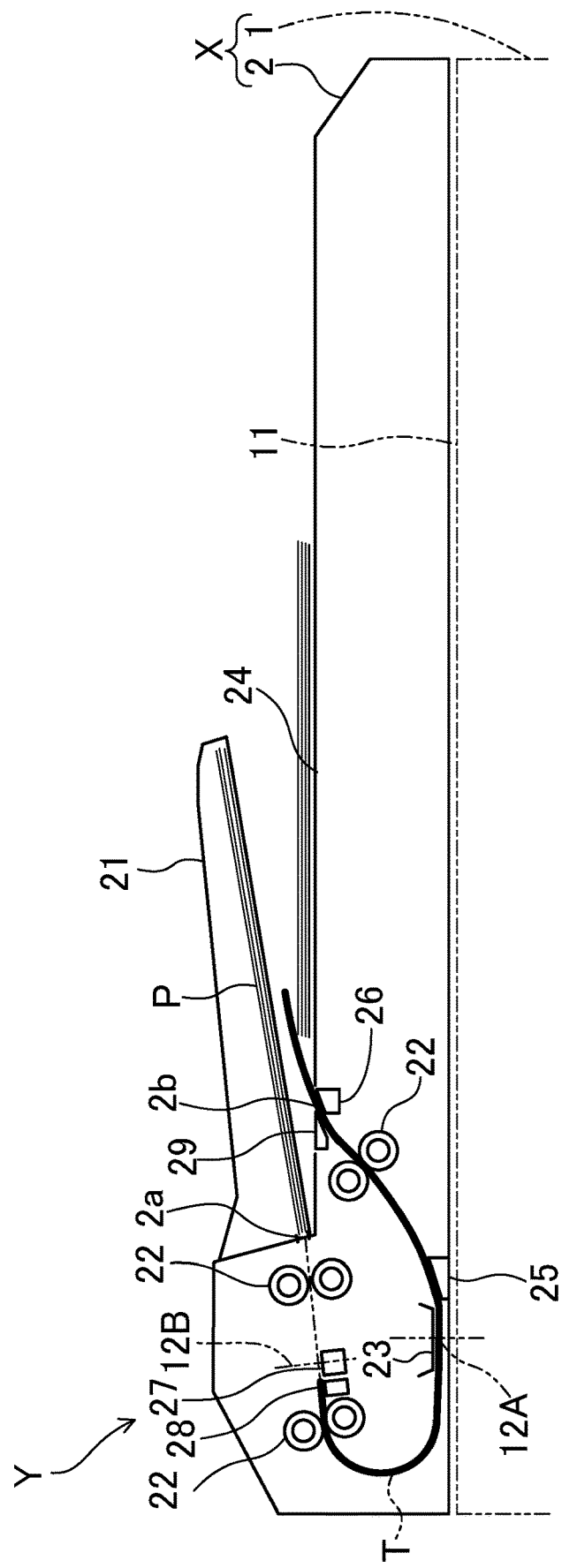
FIG. 14 is a diagram illustrating a state in which reading of a back surface of a document has been completed and reading of a front surface has not been completed in an embodiment 2.
Figure 15:
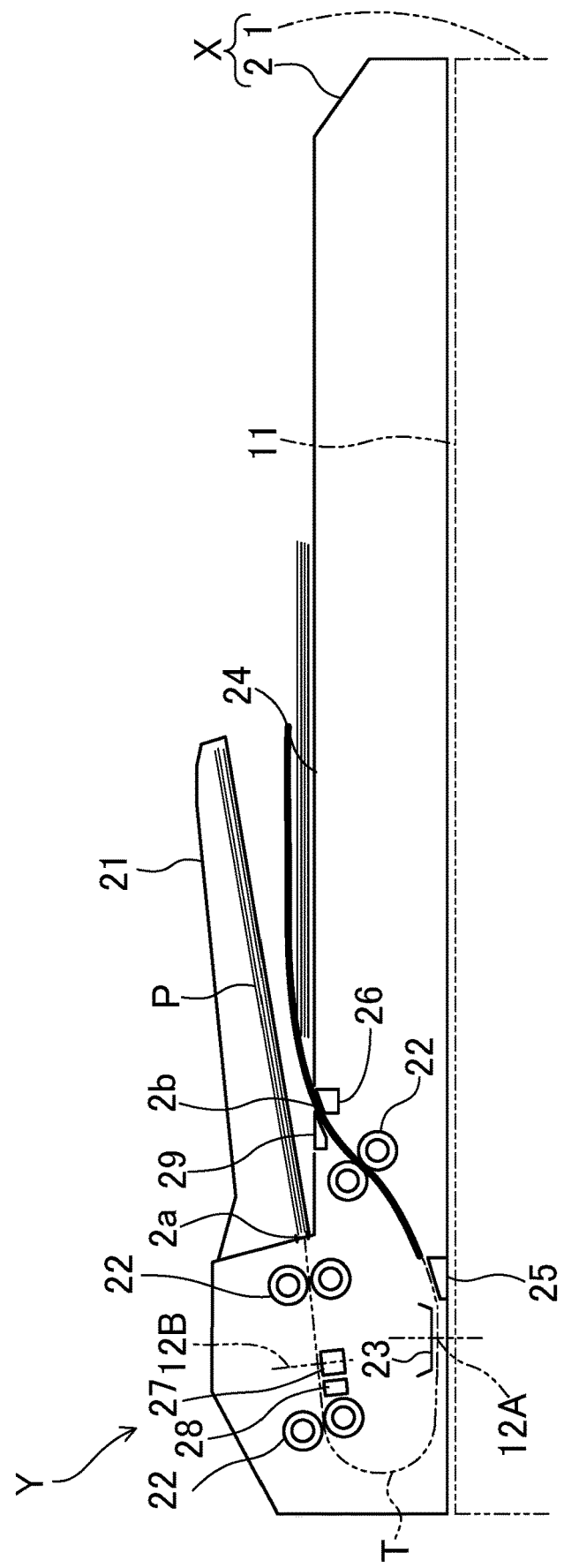
FIG. 15 is a diagram illustrating a state in which reading of a front surface and a back surface of a document has been completed in an embodiment 2.

According to this, storage and erasing of document image data are appropriately performed according to whether the state of the document P stopped while passing through the sheet discharge port 2b corresponds to (I) a first state (a state of FIG. 13) in which reading of the back surface and the front surface have not been completed, (II) a second state (a state of FIG. 14) in which the reading of the back surface has been completed and the reading of the front surface has not been completed, or (III) a third state (a state of FIG. 15) in which the reading of the front surface and the back surface have been completed, so that it is possible to prevent a read image from being lost or redundantly stored after the document P is set again.

That is, in the first state (the state of FIG. 13), since the rear end of the document P has not passed through the first marking part 25 and the second marking part 28, neither the first predetermined mark M nor the second predetermined mark m is applied to the rear end of the document P. Consequently, after the reading of the document P is restarted, the document image data of the document P is stored in the image data storage unit 6 by the control unit 4 (step SB106). Thus, it is possible to prevent the document image data from being lost.

In the second state (the state of FIG. 14), the rear end of the document P has passed through the second marking part 28, but does not reach the first marking part 25. Therefore, the second predetermined mark m is applied to the back surface of the document P, but the first predetermined mark M is not applied to the front surface of the document P. Consequently, after the reading of the document P is restarted, the image data of both the back surface of the document P is erased by the control unit 4 (SB105) and the image data of the front surface of the document P is stored in the image data storage unit 6 (step SB106). Thus, it is possible to prevent the image data of the back surface of the document P from being redundantly stored.

In the third state (the state of FIG. 15), since the rear end of the document P has passed through the first marking part 25 and the second marking part 28, the first predetermined mark M is applied to the front surface of the document P and the second predetermined mark m is applied to the back surface of the document P. Consequently, after the reading of the document P is restarted, the image data of the front surface and the back surface of the document P is erased by the control unit 4 (SB105), so that it is possible to prevent image data from being redundantly stored.

Furthermore, in the present embodiment, the second predetermined mark m applied to the back surface of the document P is different from the predetermined mark M applied to the front surface. Consequently, when a document image is read again, even though a worker has erroneously set the front and back of the document P in a reverse direction, the control unit 4 can recognize the error on the basis of the shape of the read predetermined mark. When the control unit 4 recognizes an error on the front and back when a document is set again, an error may be displayed or subsidiary front/back information of a document image may be corrected to correct information.

Other Embodiments

In the aforementioned embodiments, the predetermined mark M (the first and second predetermined marks M and m in the embodiment 2) is erased by heat; however, the present disclosure is not limited thereto and the predetermined mark M (the first and second predetermined marks M and m) may be formed of a material erasable by light irradiation. In such a case, the mark erasing part is configured by a light irradiation part that irradiates light toward the predetermined mark M (the first and second predetermined marks M and m).

In the aforementioned embodiments, the predetermined mark M (the first and second predetermined marks M and m in the embodiment 2) is erased by making it transparent; however, the predetermined mark M (the first and second predetermined marks M and m) may be erased by directly scrubbing it with an eraser and the like. That is, the transparentization of the predetermined mark M (the first and second predetermined marks M and m) is only an example of a method for erasing the predetermined mark M (the first and second predetermined marks M and m), and other methods may be used.

Furthermore, in the aforementioned embodiments 1 and 2, after the automatic reading is restarted, it is determined whether the predetermined mark M (the first and second predetermined marks M and m in the embodiment 2) exists in the document image data of an initially read document P and a process for erasing or storing the image data is performed; however, the present disclosure is not limited thereto and the process may be performed for all documents P read after the automatic reading is restarted.

In the aforementioned embodiments, the multifunctional peripheral Y has been described as an example of an image forming apparatus; however, the present disclosure is not limited thereto. That is, the image forming apparatus, for example, may include a printer, a facsimile, a copy machine and the like.

What is claimed is:

1. An image reading device including a document feeding device, which has a document conveyance path from a sheet feeding port to a sheet discharge port via an upper surface side of an automatic reading glass and conveys a document set on a document placing part along the document conveyance path, a first reading unit for reading a document image of one surface of the document passing through a first reading position set at the upper surface side of the automatic reading glass in the document conveyance path from a lower surface side of the automatic reading glass, and an image data processing unit for converting the document image read by the first reading unit into image data and storing the image data, comprising:
    a first marking part provided at a downstream side in a document conveyance direction from the first reading position in the document conveyance path to apply a first predetermined mark to a margin of an upstream side in the document conveyance direction from an image formation region on the one surface of the document; and
    a first mark erasing part provided in the vicinity of the sheet discharge port of the document feeding device to erase the first predetermined mark applied to the margin of the document when the first predetermined mark passes through the sheet discharge port,
    wherein the image data processing unit is configured to determine whether the first predetermined mark exists in the image data of the document image of the one surface read by the first reading unit, and to erase the image data when it is determined that the first predetermined mark exists.

2. The image reading device of claim 1, wherein the first mark erasing part is configured to be slidably movable between a first position, at which the first predetermined mark is erasable, and a second position, at which the first predetermined mark is not erasable, when the first predetermined mark applied to the margin of the one surface of the document passes through the sheet discharge port, and is used at the first position during document conveyance by the document feeding device.

3. The image reading device of claim 1, wherein the first marking part applies the first predetermined mark by using ink that becomes transparent by heat, and the first mark erasing part includes a heater part that generates heat enough to allow the first predetermined mark to be transparent.

4. The image reading device of claim 1, further comprising:

a second reading unit that reads a document image of the other surface of the document at a second reading position different from the first reading position in the document conveyance path;

a second marking part provided at the downstream side in the document conveyance direction from the second reading position in the document conveyance path to apply a second predetermined mark to a margin of the upstream side in the document conveyance direction from an image formation region on the other surface of the document; and a second mark erasing part provided in the vicinity of the sheet discharge port of the document feeding device to erase the second predetermined mark applied to the margin of the other surface of the document when the second predetermined mark passes through the sheet discharge port, wherein the image data processing unit is configured to determine whether the second predetermined mark exists in image data of the document image of the other surface read by the second reading unit, and to erase the image data when it is determined that the second predetermined mark exists.

5. The image reading device of claim 4, wherein the second mark erasing part is configured to be slidably movable between a first position, at which the second predetermined mark is erasable, and a second position, at which the second predetermined mark is not erasable, when the second predetermined mark applied to the margin of the other surface of the document passes through the sheet discharge port, and is used at the first position during document conveyance by the document feeding device.

6. The image reading device of claim 4, wherein the second marking part applies the second predetermined mark by using ink that becomes transparent by heat, and the second mark erasing part includes a heater part that generates heat enough to allow the second predetermined mark to be transparent.

7. An image forming apparatus comprising the image reading device of claim 1.

* * * * *